(12) United States Patent
Hu et al.

(10) Patent No.: US 11,341,728 B2
(45) Date of Patent: May 24, 2022

(54) ONLINE TRANSACTION BASED ON CURRENCY SCAN

(71) Applicant: Snap Inc., Santa Monica, CA (US)

(72) Inventors: Hao Hu, Bellevue, WA (US); Kevin Sarabia Dela Rosa, Seattle, WA (US); Bogdan Maksymchuk, Los Angeles, CA (US); Volodymyr Piven, Odessa (UA); Ekaterina Simbereva, New York, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 16/949,079

(22) Filed: Oct. 13, 2020

(65) Prior Publication Data
US 2022/0101609 A1    Mar. 31, 2022

Related U.S. Application Data

(60) Provisional application No. 63/198,148, filed on Sep. 30, 2020.

(51) Int. Cl.
*G06K 9/00* (2022.01)
*G06T 11/00* (2006.01)
(Continued)

(52) U.S. Cl.
CPC .......... *G06T 19/006* (2013.01); *G06K 9/6215* (2013.01); *G06Q 30/0279* (2013.01); *G06V 10/462* (2022.01)

(58) Field of Classification Search
CPC ... G06T 19/006; G06T 11/00; G06T 2200/24; G06K 9/4671; G06K 9/6215; G06K 9/00671; G06K 9/2063; G06Q 30/0279
See application file for complete search history.

(56) References Cited

U.S. PATENT DOCUMENTS

| 5,577,135 A | 11/1996 | Grajski et al. |
| 8,493,353 B2 | 7/2013 | Blanchflower et al. |
| (Continued) | | |

FOREIGN PATENT DOCUMENTS

| WO | 2016077493 | 5/2016 |

OTHER PUBLICATIONS

"U.S. Appl. No. 16/949,077, Non Final Office Action dated Oct. 15, 2021", 10 pgs.
(Continued)

*Primary Examiner* — Jin Cheng Wang
(74) *Attorney, Agent, or Firm* — Schwegman Lundberg & Woessner, P.A.

(57) ABSTRACT

Aspects of the present disclosure involve a system and a method for performing operations comprising: capturing an image that depicts currency, receiving an identification of an augmented reality experience associated with the image, the server identifying the augmented reality experience by assigning visual words to features of the image and searching a visual search database to identify a plurality of marker images associated with one or more charities, and the server retrieving the augmented reality experience associated with a given one of the plurality of marker images; automatically, in response to capturing the image that depicts currency, displaying one or more graphical elements of the identified augmented reality experience that represent a charity of the one or more charities; and receiving a donation to the charity from a user of the client device in response to an interaction with the one or more graphical elements that represent the charity.

20 Claims, 16 Drawing Sheets

(51) Int. Cl.
*G06Q 30/02* (2012.01)
*G06T 19/00* (2011.01)
*G06K 9/62* (2022.01)
*G06V 10/46* (2022.01)

(56) References Cited

U.S. PATENT DOCUMENTS

| | | | |
|---|---|---|---|
| 9,280,560 | B1 | 3/2016 | Dube et al. |
| 9,684,941 | B2 | 6/2017 | Filler |
| 9,720,934 | B1 | 8/2017 | Dube et al. |
| 9,830,631 | B1 | 11/2017 | Dhua et al. |
| 10,149,958 | B1 | 12/2018 | Tran et al. |
| 10,282,914 | B1 | 5/2019 | Tran et al. |
| 10,636,062 | B1 * | 4/2020 | Mossoba .............. G06F 3/017 |
| 10,699,124 | B1 * | 6/2020 | Herzberg .......... G06K 9/00442 |
| 2008/0080012 | A1 | 4/2008 | Mock et al. |
| 2013/0080172 | A1 | 3/2013 | Talwar et al. |
| 2013/0201182 | A1 | 8/2013 | Kuroki et al. |
| 2013/0202213 | A1 * | 8/2013 | Adamek .............. G06K 9/4676 382/201 |
| 2014/0078144 | A1 | 3/2014 | Berriman et al. |
| 2014/0317012 | A1 * | 10/2014 | Can ................... G06Q 30/0279 705/329 |
| 2014/0340423 | A1 | 11/2014 | Taylor et al. |
| 2015/0206343 | A1 | 7/2015 | Mattila et al. |
| 2015/0262036 | A1 * | 9/2015 | Song ...................... G06F 16/24 382/159 |
| 2015/0348329 | A1 | 12/2015 | Carre et al. |
| 2016/0098619 | A1 | 4/2016 | Gaidon et al. |
| 2017/0323481 | A1 | 11/2017 | Tran et al. |
| 2018/0069937 | A1 | 3/2018 | Kolleri |
| 2018/0184038 | A1 | 6/2018 | Li |
| 2019/0102922 | A1 | 4/2019 | Gum |
| 2019/0236167 | A1 | 8/2019 | Hu et al. |
| 2019/0362154 | A1 | 11/2019 | Moore et al. |
| 2019/0392058 | A1 | 12/2019 | Konow Krause et al. |
| 2020/0082668 | A1 * | 3/2020 | Foley ................. G07F 17/3223 |
| 2020/0279305 | A1 * | 9/2020 | Mossoba ............... G06F 3/011 |
| 2021/0004589 | A1 * | 1/2021 | Turkelson ........... G06K 9/6273 |
| 2021/0073543 | A1 * | 3/2021 | Herzberg .......... G06Q 30/0276 |
| 2021/0152975 | A1 * | 5/2021 | Hohman ............... H04W 4/029 |

OTHER PUBLICATIONS

"U.S. Appl. No. 16/949,077, Response filed Jan. 7, 2022 to Non Final Office Action dated Oct. 15, 2021", 9 pgs.

* cited by examiner

ONLINE TRANSACTION BASED ON CURRENCY SCAN

CLAIM OF PRIORITY

This application claims the benefit of priority to U.S. Provisional Application Ser. No. 63/198,148, filed on Sep. 30, 2020, which is incorporated herein by reference in its entirety.

TECHNICAL FIELD

The present disclosure relates generally to providing graphical elements using a messaging application.

BACKGROUND

Modern day user devices provide messaging applications that allow users to exchange messages with one another. Such messaging applications have recently started incorporating graphics in such communications. Users can select between various predetermined graphics to incorporate into their communications.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
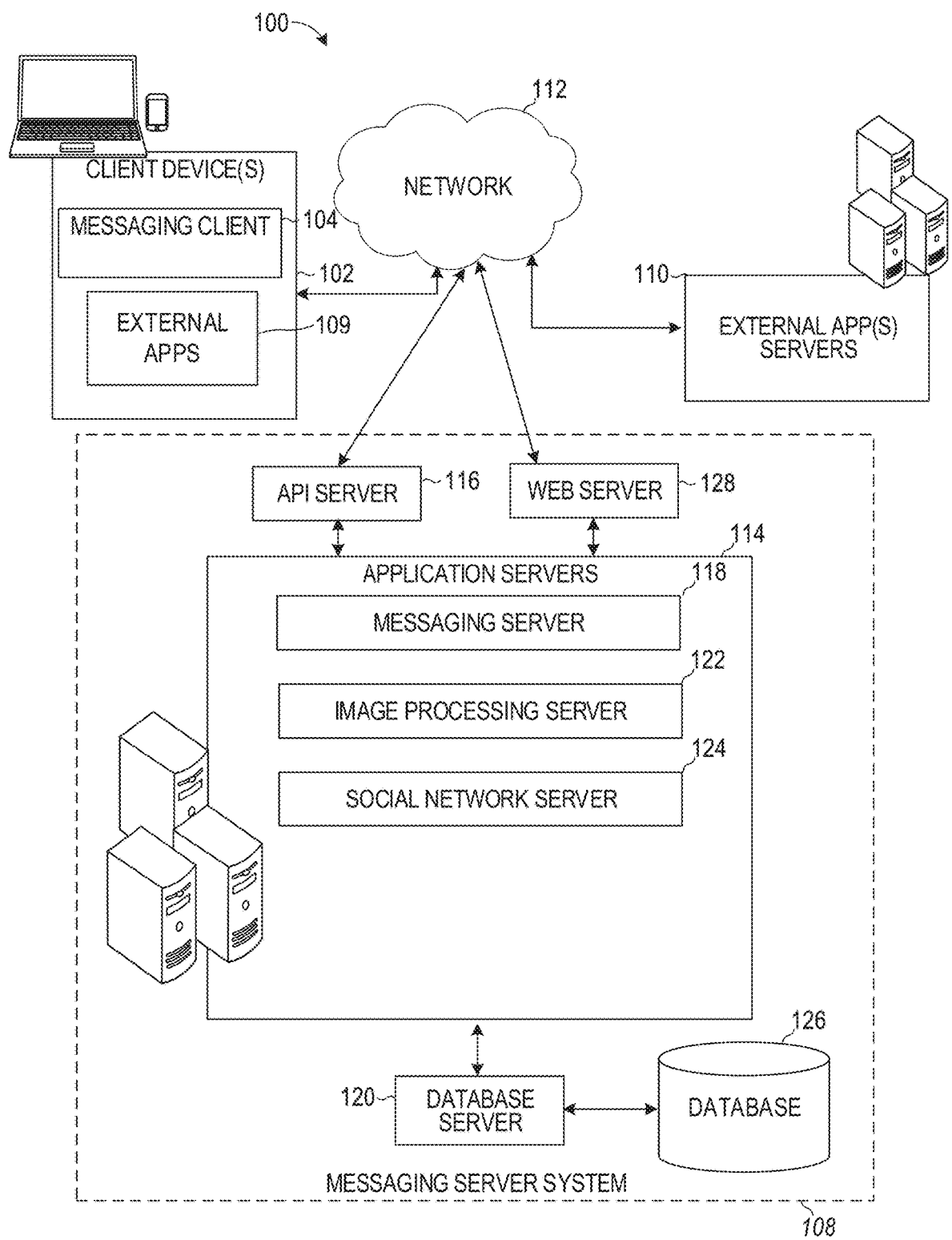
FIG. 1 is a diagrammatic representation of a networked environment in which the present disclosure may be deployed, in accordance with some examples.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments. It will be evident, however, to those skilled in the art, that embodiments may be practiced without these specific details. In general, well-known instruction instances, protocols, structures, and techniques are not necessarily shown in detail.

Typically, users exchange messages with each other using messaging applications. Such applications allow users to select from a predefined list of images to send to one another. Users are increasingly communicating with each other using such images to convey their thoughts. However, finding the right images to convey a particular thought can be tedious and time consuming. Specifically, the user has to manually search using keywords for a particular image that conveys a given message. This requires navigating through multiple pages of information until the desired image is found. Given the complexity and amount of time it takes to find the right image, users become discouraged from communicating using the images, which results in a waste of resources or lack of use.

Certain systems allow a user to specify a type of object that is present in an image that is captured. These systems then search the captured image for the specific type of object that is specified. If the object is found, then a corresponding augmented reality element is provided to the user. These systems burden the user with having to search through many types of objects to find the one of interest before the system can analyze the image to determine whether the image contains the specified object. This manual process and lack of automation discourages use of these functions which also wastes resources.

The disclosed embodiments improve the efficiency of using the electronic device by providing a system that automatically and intelligently selects and presents augmented reality experiences for a user to use to augment a captured image to be shared with another user in a messaging application based on features of an image captured by the user. Specifically, the disclosed embodiments activate one or more augmented reality experiences by scanning an image that is captured by a client device without having the user specify the type of image or type of objects that are present in the image.

According to the disclosed embodiments, a messaging application implemented by one or more processors of a client device receives a request to scan an image captured by a camera of the client device. The messaging application provides the image to a messaging application server which then uses a visual codebook to find a matching image that contains an object that is depicted in the image captured by the messaging application on the client device. Specifically, the messaging application server assigns a first of the plurality of features and a second of the plurality of features respectively to a first nearest visual codebook cluster and a second nearest visual codebook cluster. The messaging application server applies the first and second nearest visual codebook clusters to a visual search database to identify a plurality of candidate matching images and selects a given matching image based on a geometric verification of the plurality of matching images and the received image. Once the given matching image is selected, the augmented reality experience corresponding to the given matching image is accessed and provided back to the messaging application implemented on the client device to augment the image captured by the client device or one or more other images or videos.

In this way, the disclosed embodiments improve the efficiency of using the electronic device by reducing the number of screens and interfaces a user has to navigate through to find an augmented reality item to augment an image captured by the user to then share with other users. This is done by determining an attribute of an object depicted in an image captured by the user device with the messaging application and then searching for augmented reality items that are associated with the attribute for presentation to the user. This reduces the device resources (e.g., processor cycles, memory, and power usage) needed to accomplish a task with the device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118. Detailed functionality of the image processing server 122 is shown and described in connection with FIG. 5.

Image processing server 122 is used to implement scan functionality of the augmentation system 208. Scan functionality includes activating and providing one or more augmented reality experiences on a client device 102 when an image is captured by the client device 102. Specifically, the messaging application 104 on the client device 102 can be used to activate a camera. The camera displays one or more real-time images to a user along with one or more options. The user can select a scan option or can press and hold the user's finger on the image currently displayed by the client device 102. In response, the augmentation system 208 in communication with the image processing server 122 analyzes the image currently displayed and identifies one or more augmented reality experiences associated with an object depicted in the image.

In one embodiment, the image processing server 122 includes a front-end module that acts as a router to different micro-services/containers which communicate with each other through various proxies. The front-end module obtains metadata associated with the captured image, such as the location, time, known features, known objects, orientation, size, and so forth. The front-end module uses the metadata to route the image for processing by specific analyzer modules. Analyzer modules include any combination of visual matching image analyzer (e.g., visual search module discussed in connection with FIG. 5), a marker search analyzer, a currency analyzer, a museum artwork analyzer, a brute force analyzer, a logo detection analyzer, an open images analyzer, a face detection, a not safe for work analyzer, a content finder analyzer, a lookalike analyzer, and various other deep learning based analyzers. The analyzers can work in parallel or sequentially or may be selectively activated to process a given image by the front-end module. Each analyzer module performs visual matching for a specific use case against a provided image. In some cases, the visual search matching image analyzer can be trained and used to perform the function of all or a given subset of the analyzer modules.

Each analyzer module performs computer vision or machine learning processes and returns annotations relevant to the content contained in the given image. Such annotations can include identifiers of specific augmented reality experiences, logo names, bounding coordinates for objects and brands, metadata about a matching painting, and so forth. Using the annotations, the image processing server 122 communicates with the augmentation system 208 to select and activate a particular augmented reality experience, such as the presentation of one or more augmented reality elements on a real-time or stored video or image displayed on the client device 102. Specifically, the front-end module processes the annotations returned by one or more of the analyzer modules, ranks and filters the annotations to select a subset of annotations. The selected subset of annotations or the highest ranked annotation is provided to the augmentation system 208 to select and activate a corresponding augmented reality experience associated with the annotation.

In some embodiments, the visual search module of the image processing server 122 receives a query image and performs pre-processing operations on the query image. For example, the visual search module transforms raw image bytes or information into image data (e.g., Numpy array or tensors) and can perform re-scaling and normalization. In some implementations, the pre-processing operations include resizing and reorienting an input image to match a template size and orientation. The visual search module processes the image with a feature extractor to transform the image data into a feature map representing the query image. The features extracted by the feature extractor are provided to a candidate retriever which accesses a visual search database to retrieve a set of candidate matching images. For example, the candidate retriever processes the image with a visual codebook and term-frequency inverse document frequency (TF-IDF) matrix of image descriptors derived from image features to identify the set of candidate matching images. The candidate matching images are filtered based on a specified criteria (e.g., based on geometric attributes of the matching images). The filtered images are provided to a response creator to generate a list of retrieval results or annotations which are used to select and activate a given one or more augmented reality experience.

In some implementations, the visual search module can process images to generate annotations or find matching images using various computer vision techniques that process various feature sets at specific key points or regions in an image or deep learning object detection models. The visual search module is trained offline to index data in a way that can be surfaced quickly and efficiently by the image processing server 122. In one embodiment, the visual search module is trained to generate a visual bag of words and use the visual bag of words to detect presence of an object or multiple objects in a given query image. The training and use process for the visual search module is shown and discussed below in connection with FIG. 5.

Figure 3:
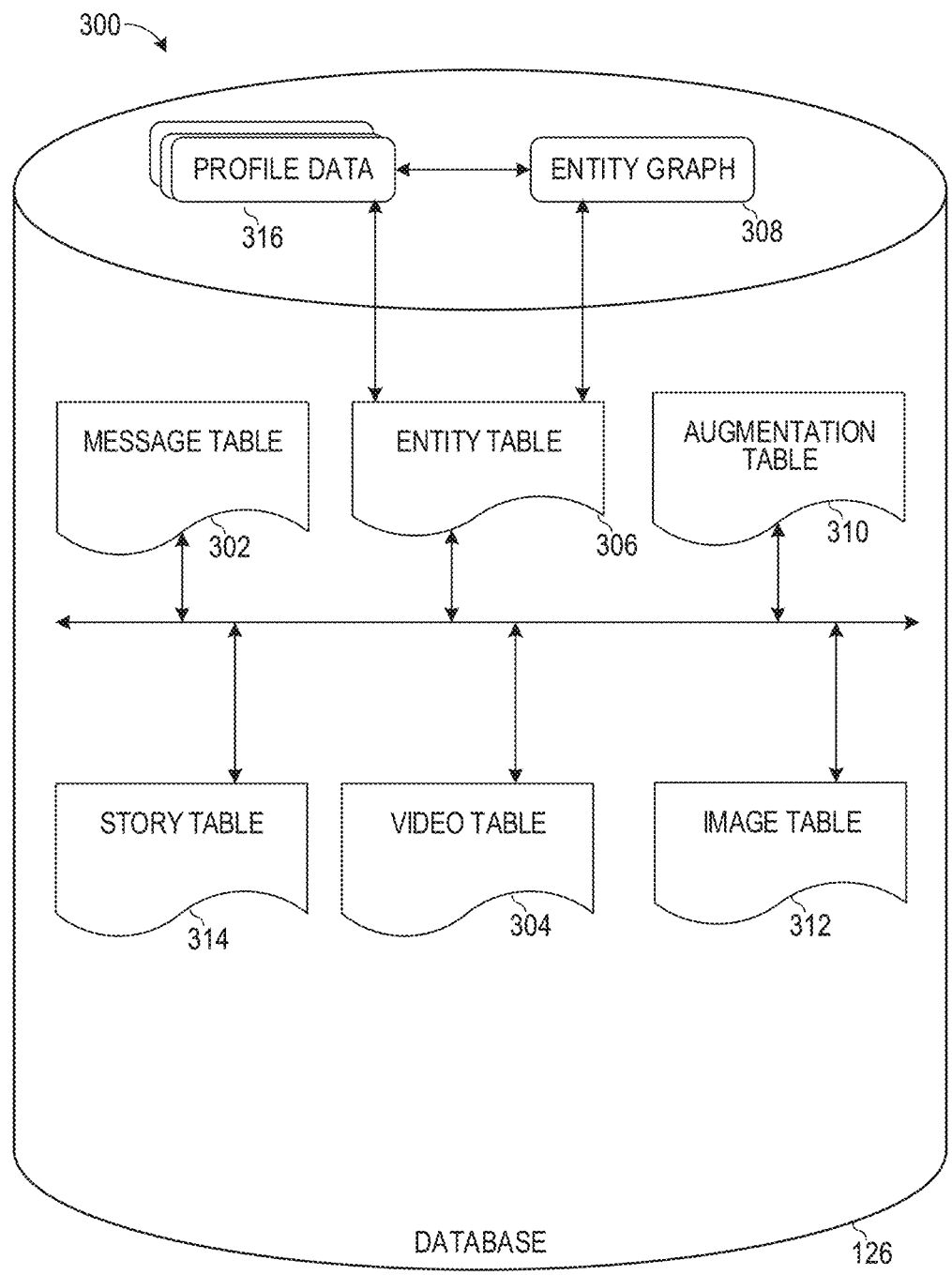
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

Figure 2:
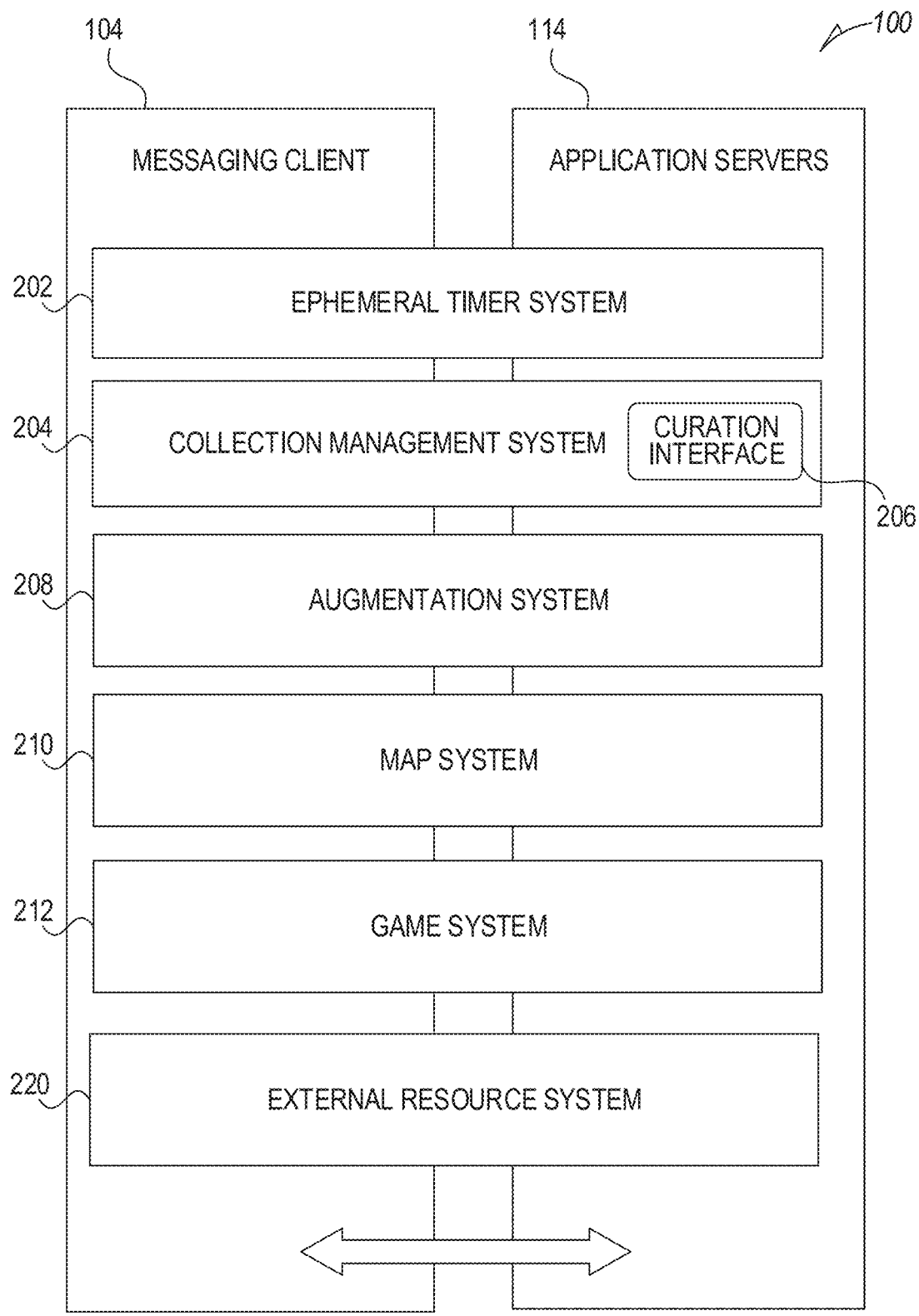
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video. Each augmented reality experience may be associated with one or more marker images. In some embodiments, when a marker image is determined to match a query image received from the client device 102, the corresponding augmented reality experience (e.g., the augmentation data) of the maker image is retrieved from the image table 312 and provided to the client device 102. Various types of augmented reality experiences are shown and discussed in connection with FIGS. 9A-E.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
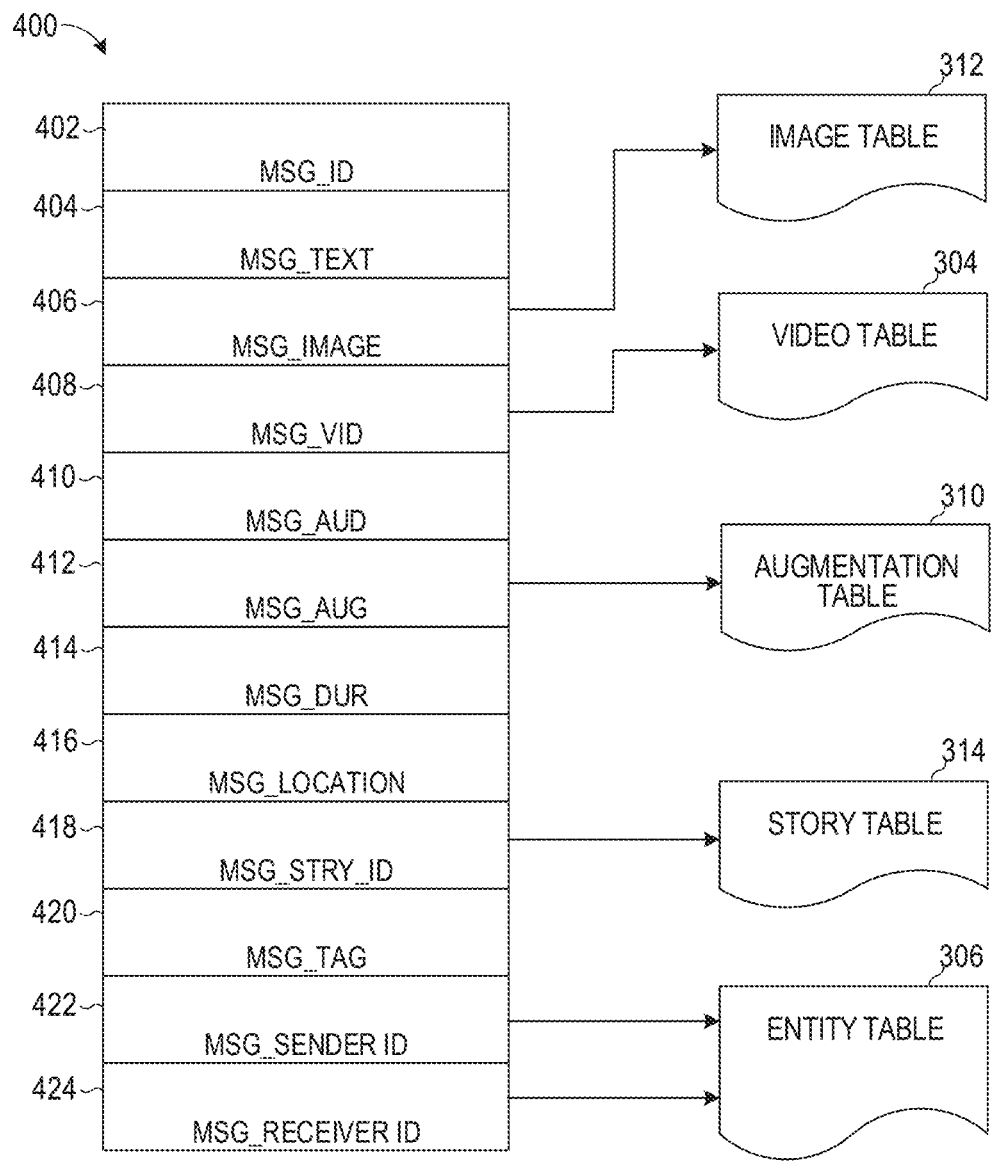
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
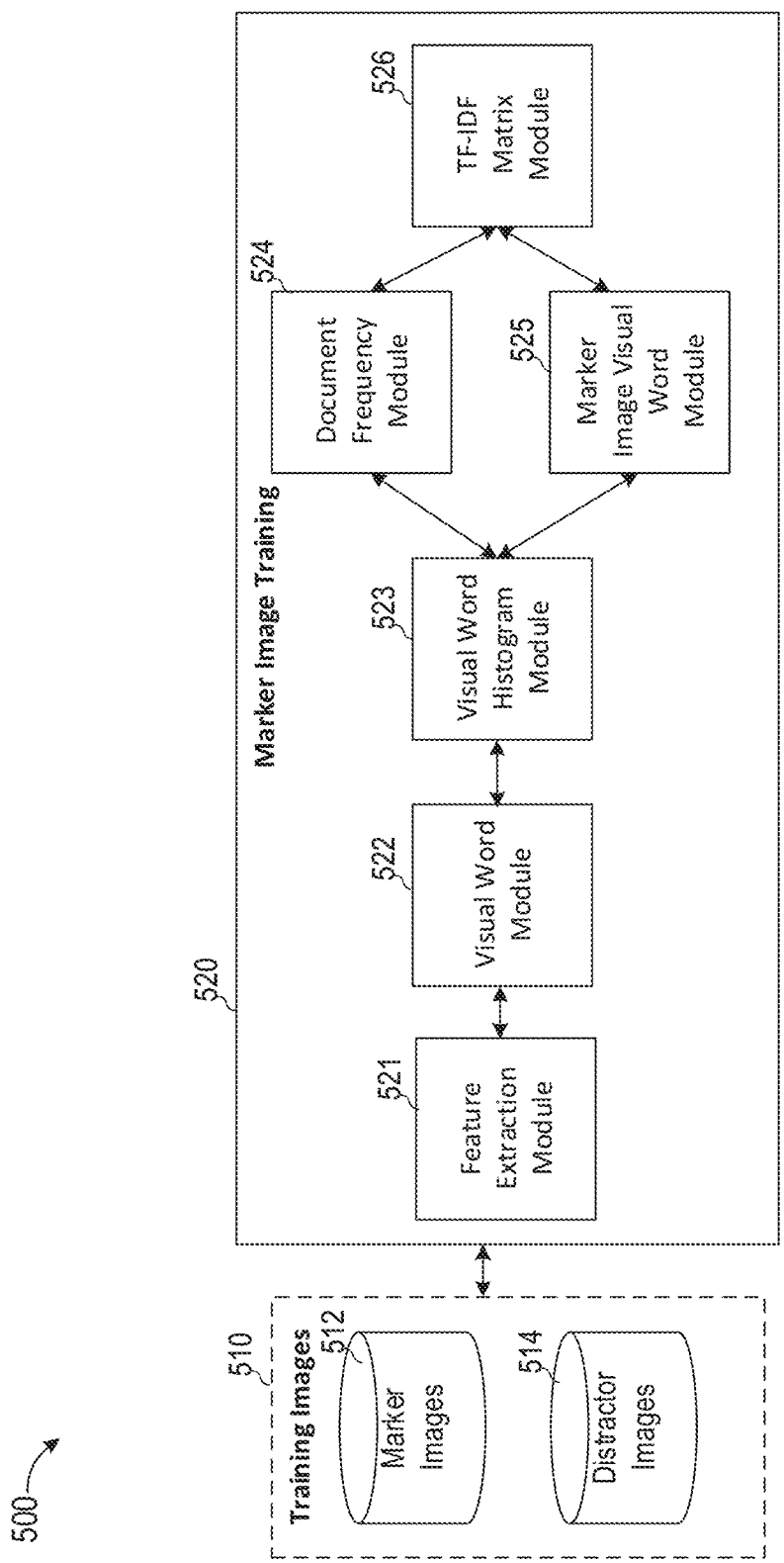
FIG. 5 is a diagrammatic representation of a visual search module, in accordance with some examples.

FIG. 5 is a diagrammatic representation of a visual search module 500, in accordance with some examples. The visual search module 500 may be a component of the image processing server 122 of the messaging server system 108. The augmentation system 208 may communicate with the visual search module 500 to provide a query image to identify one or more matching marker images. The augmentation system 208 may activate one or more augmented reality experiences based on the marker image determined to match a given query image by the visual search module 500.

The visual search module 500 includes training images 510 and a marker image training module 520. The marker image training module 520 includes a feature extraction module 521, a visual word module 522, a visual word histogram module 523, a document frequency module 524, a marker image visual word module 525 and a TF-IDF matrix module 526. The training images 510 includes a database of maker images 512 and a database of distractor images 514. The marker images 512 include a set or collection of images with known or predefined markers that trigger one or more augmented reality experiences. These marker images includes marks or specified types of visual attributes that are associated with corresponding augmented reality experiences. The distractor images 514 include a set or collection of various random images that are retrieved from the Internet. The distractor images 514 do not include any known marks or features and are not associated with any augmented reality experiences.

During training, the marker image training module 520 accesses a given image from the training images 510. In one example, the marker image training module 520 alternatively retrieves images from the database of maker images 512 and the database of distractor images 514. In one example, the marker image training module 520 randomly selects images from the database of maker images 512 and the database of distractor images 514. In one example, the marker image training module 520 first is trained on all of the database of maker images 512 and is then further trained based on the database of distractor images 514.

Figure 7:
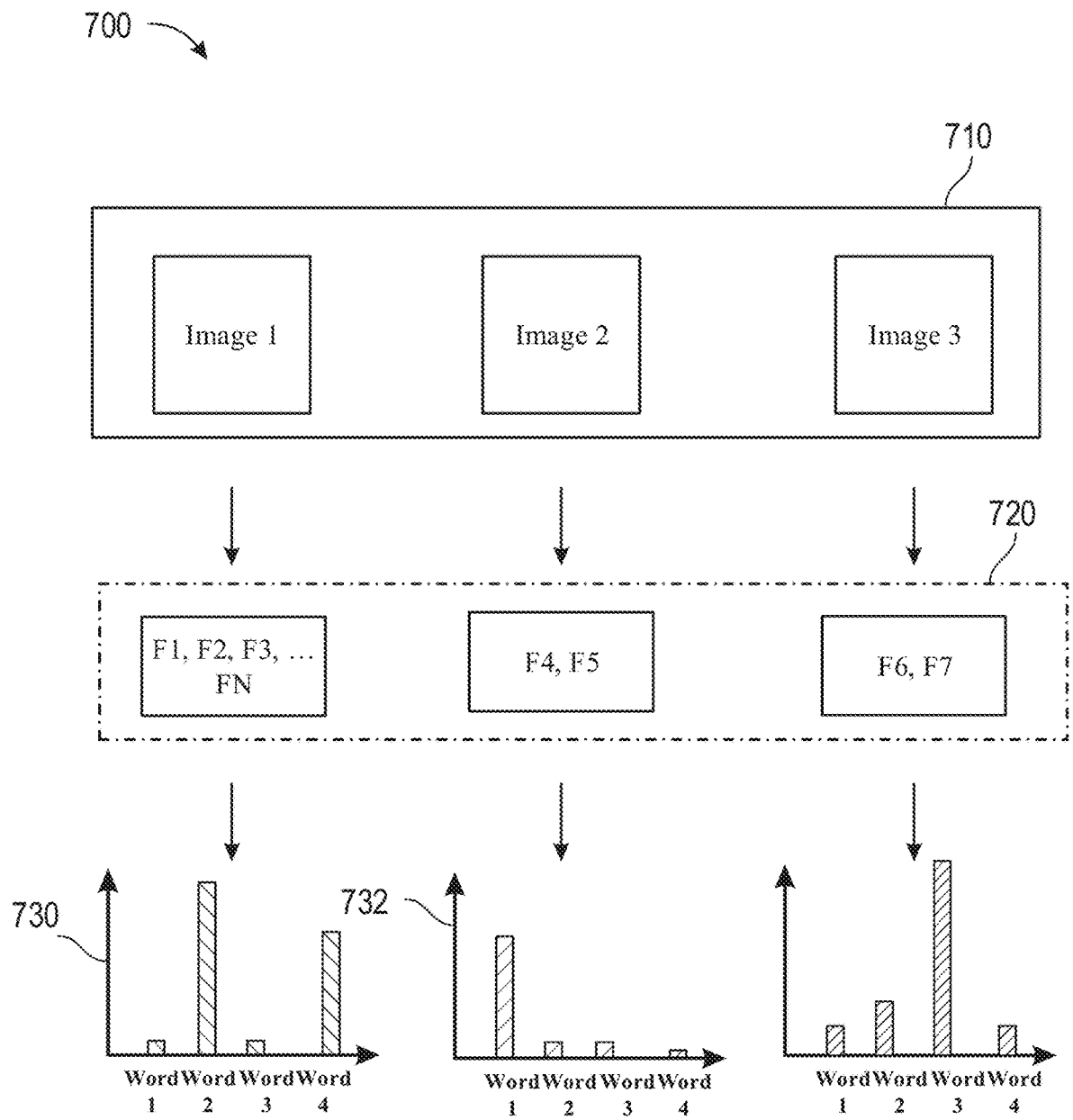
FIG. 7 is a diagrammatic representation of a visual bag of words histogram, in accordance with some examples.

The feature extraction module 521 processes a given one of the images that has been retrieved from the training images 510. The feature extraction module 521 resizes and scales the retrieved image to a common size and generates a plurality of features from the given image. In one example, the feature extraction module 521 computes a root scale-invariant feature transform (SIFT) based on the identified plurality of features of the image. The feature extraction module 521 provides the list of features, such as the root SIFT to the visual word module 522. For example, as shown in FIG. 7, a set of training images 710 are received and processed by the feature extraction module 521. The feature extraction module 521 generates a list of features 720 for each of the images 710.

The visual word module 522 trains a k-means index based on the received features. For example, the visual word module 522 generates a descriptor to represent a collection of similar features and assigns different collections of the features to the descriptor that represents the collection of features. Specifically, the visual word module 522 assigns centroids to represent visual words (e.g., descriptors) that are present in the received features. In one example, the visual word module 522 identifies a first collection of features that are similar or that are within a threshold level of similarity. The visual word module 522 determines whether the first collection of features matches a previously stored cluster of features in the visual word module 522. If a previously stored cluster of features is found, the first collection of features is associated with the visual word of the previously stored cluster of features. If a previously stored cluster of features is not found, the visual word module 522 creates a new visual word to represent the first collection of features and selects a centroid to associate with the first collection of features. The visual word module 522 then associates the first collection of features with the new visual word that has been created. The visual word module 522 continues to process all of the features of the plurality of features in a similar manner until all of the collection of features are associated with respective visual words.

Figure 6:
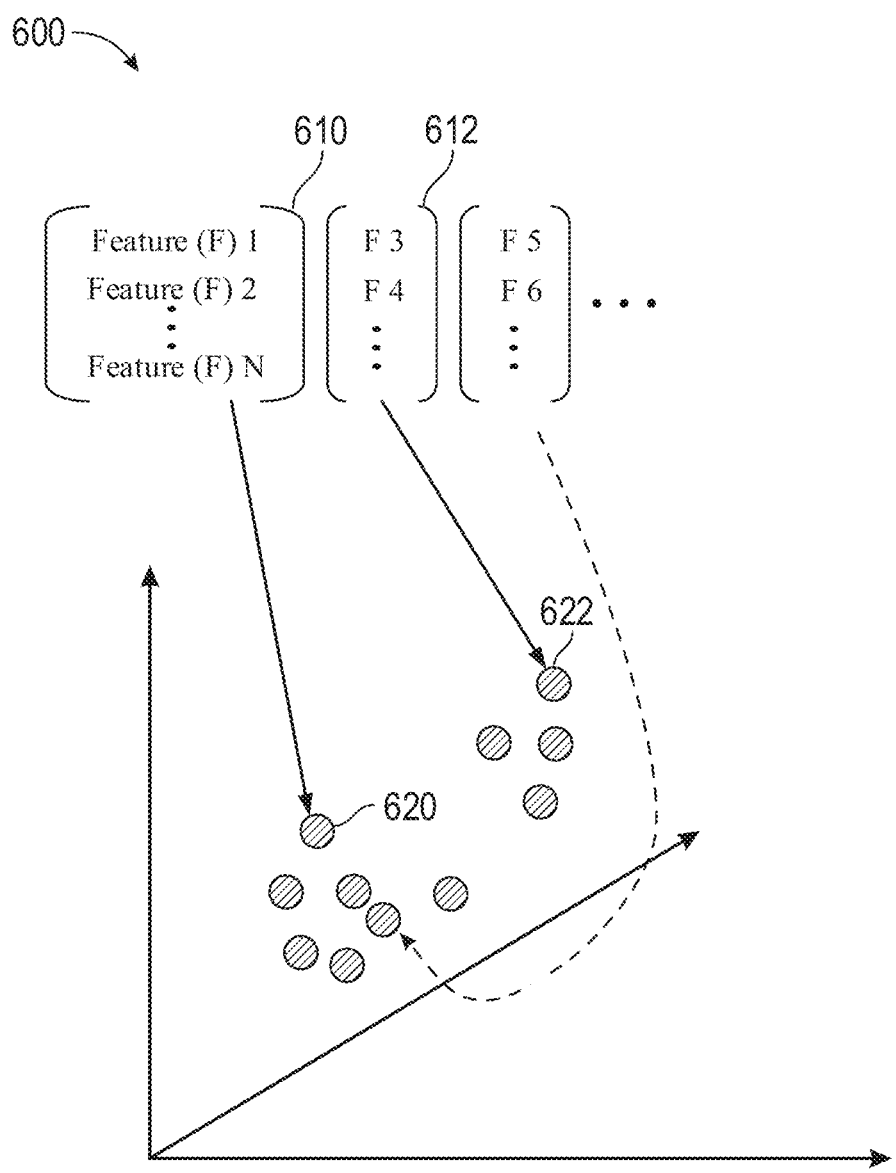
FIG. 6 is a diagrammatic representation of visual codebook clusters, in accordance with some examples.

For example, as shown in FIG. 6, a first collection of features 610 is identified in the received features from the feature extraction module 521. A second collection of features 612 is identified in the received features from the feature extraction module 521. The first collection of features 610 all share a common attribute or are within a threshold level of similarity of each other. The visual word module 522 determines that a first cluster of features 620, associated with a first centroid, is within a threshold level of similarity as the first collection of features 610. In response, the visual word module 522 associates the first collection of features 610 with the visual word associated with the first cluster of features 620. Similarly, the second collection of features 612 all share a common attribute or are within a threshold level of similarity of each other. The visual word module 522 determines that a second cluster of features 622, associated with a second centroid, is within a threshold level of similarity as the second collection of features 612. In response, the visual word module 522 associates the second collection of features 612 with the visual word associated with the first cluster of features 622. In some implementations, the visual word module 522 approximates a nearest neighbor index for each collection of features using the centroids of the features. The visual word module 522 assigns the visual words using the approximate nearest neighbor index.

The visual word histogram module 523 computes the counts of each visual word generated by the visual word module 522 for all of the training images 510 as each training image is processed by the visual word module 522. Specifically, the visual word histogram module 523 generates a count that represents the total number of descriptors (features) that correspond to a given visual word. This is also referred to as the term frequency. For example, after the visual word module 522 assigns the first collection of features 610 to the first cluster of features 620, the visual word module 522 adds all of the features (descriptors) in the first collection of features 610 to the first cluster of features 620. The visual word histogram module 523 counts how many features are in the first cluster of features 620 and associates that count value with the visual word that is associated with the first cluster of features 620. As more and more images are processed and more and more features of the images are associated and added to the first cluster of features 620, the count value for the corresponding visual word is increased.

The document frequency module 524 computes the document (image) frequency of each visual word that is generated by the visual word module 522. Specifically, the document frequency module 524 accumulates a value for each visual word as new training images are received and include features that are associated with a particular visual word. For example, if a training image includes features that are included in the first cluster of features 620, then the document frequency module 524 increments a value for the visual word associated with the first cluster of features 620. If the same training image does not includes features that are included in the second cluster of features 622, then the document frequency module 524 does not increment a value for the visual word associated with the second cluster of features 622. In this way, the document frequency module 524 computes values representing how many of the training images 510 include the visual words that are generated by the visual word module 522. As each new training image is processed, a subset of values associated respectively with the visual words generated by the visual word module 522 are incremented once if the features of the new training image are associated with clusters of features associated with the respective visual words.

The marker image visual word module 525 retrieves a set of or all of the marker images 512. In some cases, the marker image visual word module 525 retrieves all of the features generated based only on the marker images 512. These features are provided to the TF-IDF matrix module 526 to create a visual word codebook or visual search database. For example, the TF-IDF matrix module 526 uses only the marker images provided by the marker image visual word module 525 to create a sparse matrix representing the TF-IDF of each visual word. As an example, the TF-IDF matrix module 526 assigns weights to visual words based on their overall importance based on the marker images 512. The weight of a given visual word increase proportionally to the number of times the features associated with the given visual word appear in the marker images 512 but is offset by the frequency of the visual word in the corpus of marker images 512. This TF-IDF matrix is used during a search based on a query image to identify one or more matching marker images. In some cases, the square root of each of the features or terms is used as the term frequency of the TF-IDF to account for descriptor burstiness.

As an example, the TF-IDF weight of each visual word is composed by two terms: the first computes the normalized Term Frequency (TF) representing the number of times a visual word appears in a given one of the training images 510, divided by the total number of visual words in that given training image. The second term is the Inverse Document Frequency (IDF), computed as the logarithm of the total number of the marker images 512, provided by the marker image visual word module 525, divided by the number of marker images 512 where the specific visual word appears. Specifically, TF: Term Frequency, measures how frequently a visual term occurs in a training image. IDF measures how important a visual word is. While computing TF, all terms are considered equally important. For example, as shown in FIG. 7, the TF-IDF of each visual word is shown for each one of the images 710. Specifically, a first TF-IDF 730 represents the TF-IDF value of each visual word in a set of visual words for a first training image. A second TF-IDF 732 represents the TF-IDF value of each visual word in the set of visual words for a second training image.

The visual search module 500 can be used to identify a set of matching images given a query image. For example, the visual search module 500 may receive a query image from a client device 102. The visual search module 500 performs image pre-processing and normalization of the query image to convert the image to a common size and orientation. The visual search module 500 computes a set of features for the query image, such as by calculating a root SIFT descriptor and keypoints. The visual search module 500 accesses the visual word codebook generated previously by the visual word module 522. The visual search module 500 also accesses the document frequency for each of the visual words from the document frequency module 524. The visual search module 500 computes a visual word histogram for the features of the query image and then calculates a TF-IDF vector for the query image.

For example, the visual search module 500 identifies a first cluster of features that are similar to (that are nearest to) a set of features of the query image. In response to identifying the first cluster of features, the visual search module 500 assigns the set of features of the query image to the visual word associated with the first cluster of features. The visual search module 500 continues processing all of the extracted features of the query image to identify all of the visual words associated with the query image. The visual search module 500 computes the TF-IDF vector for the query image and searches the TF-IDF matrix to obtain the top candidate matching marker images. In some cases, the visual search module 500 generates a count of the features of the query image that is associated with each visual word (e.g., one count for each visual word) and offsets that count by the document frequency obtained from the document frequency module 524 to determine the TF-IDF value for each visual word. In some embodiments, the visual search module 500 performs a cosine similarity of the identified visual words that are associated with the query image and the visual search database TF-IDF matrix to identify the top candidate matching marker.

Figure 8:
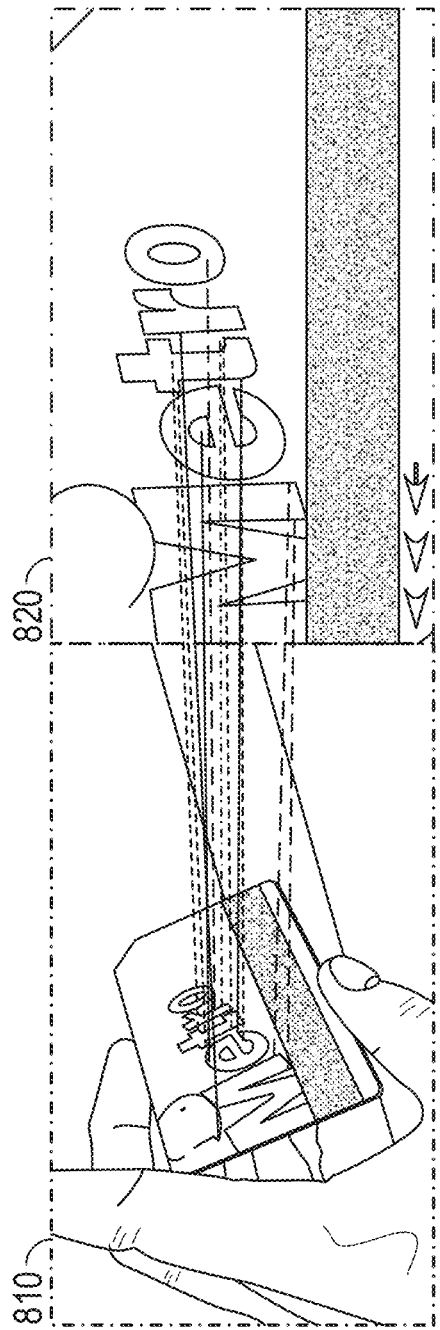
FIG. 8 is a diagrammatic representation of descriptor correspondences between a query image and a marker image, in accordance with some examples.

After identifying a set of matching marker images, the visual search module 500 performs a geometric verification to rank the matching marker images. For example, the visual search module 500 first performs a Lowe's ratio test to compare a ratio of principal curves of the plurality of matching images and the received image to a threshold. Then the visual search module 500 performs a random sample consensus (RANSAC) operation to verify the key points and then uses the number of inliers as the matching candidate score to re-rank the candidate marker images. For example, as shown in FIG. 8, a given query image 810 is processed to identify a set of features. After identifying a set of matching marker images and performing the geometric verification, a top ranked marker image 820 is identified and selected. The set of features in the query image match the set of features of the marker image, as shown by the lines extending from each feature of the query image to the corresponding feature of the marker image.

In some embodiments, the visual search module 500 searches all of the database marker images based on the query image in a brute force manner. This is done without using the TF-IDF matrix and simply compares the query image against all of the marker images stored in the database. Once a set of marker images is identified in the brute force manner, the visual search module 500 performs a geometric verification to rank the matching marker images.

Once a top ranked marker image is determined to match, a corresponding augmented reality experience corresponding to the marker image is accessed. The augmented reality experience is activated and provided back to the client device 102 to augment an image or video that is displayed by the client device 102.

FIGS. 9A-E are diagrammatic representations of graphical user interfaces, in accordance with some examples. Specifically, a messaging client 104 on a client device 102 displays a camera feed of a user's environment. The messaging client 104 continuously or periodically transmits one or more images to the visual search module 500 to identify one or more augmented reality experiences associated with features present in the one or more images. In some embodiments, the messaging client 104 transmits one or more images to the visual search module 500 to identify one or more augmented reality experiences associated with features present in the one or more images in response to receiving input from the user that presses and holds a finger for a threshold period of time on the screen displaying the one or more images.

Figure 9A:
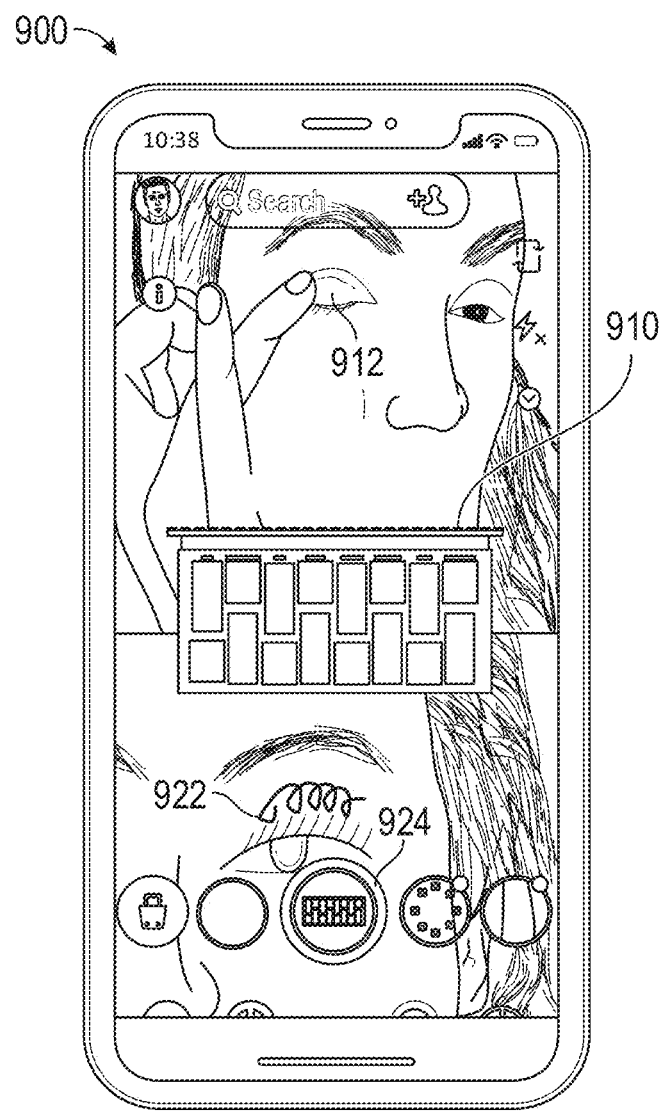
FIGS. 9A-E are diagrammatic representations of graphical user interfaces, in accordance with some examples.

For example, the one or more images captured by the client device 102 may include an object 910 (e.g., an image of a makeup palate that includes a plurality of makeup colors) (FIG. 9A). The visual search module 500 extracts a plurality of features of the object 910 and searches a visual search database to identify one or more marker images. In an embodiment, the visual search module 500 generates a TF-IDF vector based on visual words corresponding to the extracted features of the object 910 and compares the TF-IDF vector against TF-IDF vectors stored in the visual search database. The visual search module 500 ranks the identified matching images based on performing geometric verifications of the identified matching images. The visual search module 500 selects an augmented reality experience that is associated with a selected one of the identified matching images (e.g., the top ranked matching image). The visual search module 500 provides the augmented reality experience to the client device 102 or instructs the client device 102 to activate the particular augmented reality experience. As an example, as shown in FIG. 9A, the augmented reality experience includes the presentation of graphical elements 912 and 922 associated with the makeup palate that is scanned as the object 910. The messaging application 104 presents a list of augmented reality experiences and visually identifies with an indicator 924 the augmented reality experience that has been automatically activated and selected based on a match detected by the visual search module 500.

In some implementations, the object 910 is captured in an image by a rear-facing camera of the client device 102. In response to the augmented reality experience being activated that is associated with the object 910, the augmented reality experience instructs the client device 102 to automatically activate the front-facing camera instead of the rear-facing camera. This may cause images of the user's face to appear in the user interface 900. The graphical elements associated with the object 910 are then overlaid on top of the user's face images captured by the front-facing camera. Input from the user can manipulate the graphical elements to modify which portions of the user's face are covered by the graphical elements. Specifically, the object 910 may be a makeup palate. The augmented reality experience associated with object 910 may include presentation of a set of graphical elements that represent a set of makeup colors associated with the makeup palate. The user can tap on different regions of the makeup palate object 910 depicted in the camera view as a graphical element to select a makeup color. In response to receiving a first input that taps a first portion of object 910, a first set of graphical elements 912 corresponding to a first makeup color of the plurality of makeup colors are selected and presented on the face depicted in the user interface 900. In response to receiving a second input (following the first input) that taps a second portion of object 910, a second set of graphical elements 922 corresponding to a second makeup color of the plurality of makeup colors are selected and presented on the face depicted in the user interface 900. In some cases, when the second input is received, the user interface is divided into two regions and the face is depicted in both regions. The user can simultaneously apply the first set of graphical elements 912 to the face depicted in a top region by touching different portions of the face depicted in the top region. The user can simultaneously apply the second set of graphical elements 922 to the face depicted in a bottom region by touching different portions of the face depicted in the bottom region. In this way, the user can see how different makeup colors look on the user simultaneously.

Once the user is satisfied with the application of the graphical elements to the face depicted in the user interface 900, the user can select an option to purchase the makeup palate corresponding to the object 910. The user can also capture an image or video of the user modifying the face with the different graphical elements and share the image or video with one or more friends.

Figure 9B:
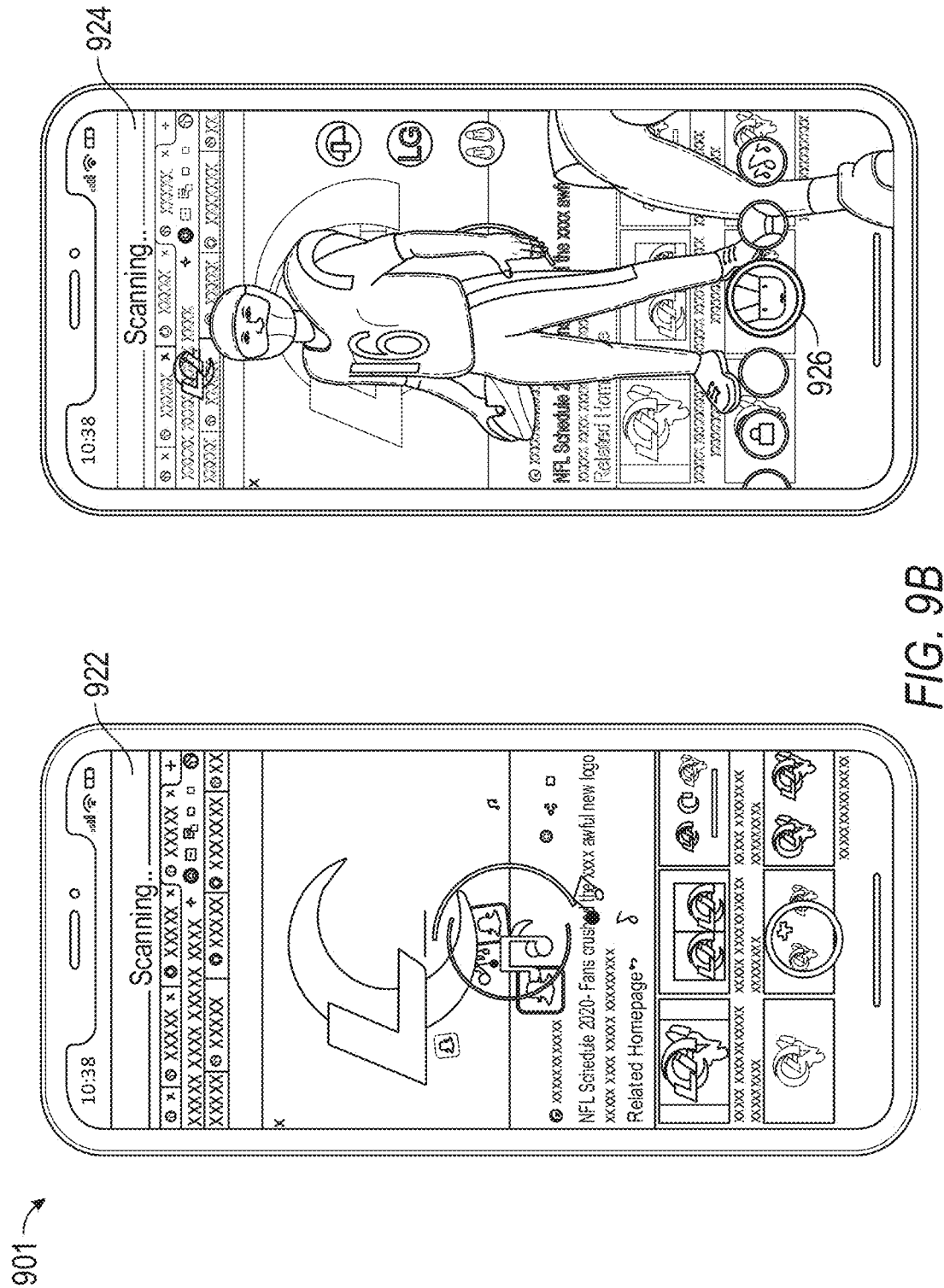

As another example, the one or more images captured by the client device 102 may include an object 922 (e.g., an image of a computer screen that displays a webpage that includes a logo of a particular team) (FIG. 9B). The visual search module 500 extracts a plurality of features of the object 922 and searches a visual search database to identify one or more marker images. While the visual search module 500 performs the scan and extraction of the plurality of features, a progress indicator (such as the word "scanning" or a set of music icons) is displayed on the user interface of the client device 102.

In an embodiment, the visual search module 500 generates a TF-IDF vector based on visual words corresponding to the extracted features of the object 922 and compares the TF-IDF vector against TF-IDF vectors stored in the visual search database. The visual search module 500 ranks the identified matching images based on performing geometric verifications of the identified matching images. The visual search module 500 selects an augmented reality experience that is associated with a selected one of the identified matching images (e.g., the top ranked matching image). The visual search module 500 provides the augmented reality experience to the client device 102 or instructs the client device 102 to activate the particular augmented reality experience. As an example, as shown in FIG. 9B, the augmented reality experience includes the presentation of a user interface 924 with a graphical element (e.g., an avatar of a player on the particular team) associated with the logo of the particular team that is scanned as the object 922. While the graphical element is presented in user interface 924, the background image that was used in the search is dimmed to enhance or call attention to the graphical element that is displayed. The messaging application 104 presents a list of augmented reality experiences and visually identifies with an indicator 926 the augmented reality experience that has been automatically activated and selected based on a match detected by the visual search module 500.

The user can interact with the graphical element displayed in user interface 924. For example, the user can select between a plurality of options to change the team member that is represented by the avatar in the user interface 924. The user can rotate the avatar and select an option to cause the user's face to be presented as the avatar of the team member. This creates an experience in which the user's face is displayed on an avatar that corresponds to a team member of the particular team that was scanned in as object 922. The user can select an option to capture an image or video of the user interacting with the avatar presented in the user interface 924 and share the image or video with one or more friends.

Figure 9C:

As another example, the one or more images captured by the client device 102 may include an object 932 (e.g., an image of a drink container) (FIG. 9C). The visual search module 500 extracts a plurality of features of the object 932 and searches a visual search database to identify one or more marker images. While the visual search module 500 performs the scan and extraction of the plurality of features, a progress indicator (such as the word "scanning" or a set of music icons) is displayed on the user interface of the client device 102.

In an embodiment, the visual search module 500 generates a TF-IDF vector based on visual words corresponding to the extracted features of the object 932 and compares the TF-IDF vector against TF-IDF vectors stored in the visual search database. The visual search module 500 ranks the identified matching images based on performing geometric verifications of the identified matching images. The visual search module 500 selects an augmented reality experience that is associated with a selected one of the identified matching images (e.g., the top ranked matching image). The visual search module 500 provides the augmented reality experience to the client device 102 or instructs the client device 102 to activate the particular augmented reality experience. As an example, as shown in FIG. 9C, the augmented reality experience includes the presentation of a user interface with a graphical elements 934 (e.g., holiday related graphical elements) associated with the drink container that is scanned as the object 932.

Specifically, the visual search module 500 determines that the matching marker image for the drink container is associated with a plurality of different augmented reality experiences. The visual search module 500 determines that the current date is within a threshold time of a particular holiday (e.g., is within a week of the holiday). In response, the visual search module 500 selects one of the plurality of augmented reality experiences that is determined to be associated with the particular holiday to provide as the selected augmented reality experience to the client device 102. The augmented reality experience that is associated with the holiday may include one or more graphical elements that represent or that are associated with the holiday. The messaging application 104 presents a list of augmented reality experiences and visually identifies with an indicator 936 the augmented reality experience that has been automatically activated and selected based on a match detected by the visual search module 500.

The user can interact with the graphical elements 934 displayed in the user interface. For example, the user can select between a plurality of options to change the types of holiday graphical elements that are overlaid on the screen. In some cases, the object 932 is captured by the rear-facing camera and the augmented reality experience automatically activates the front-facing camera to display the graphical elements on the images captured by the front-facing camera. For example, the user can capture an image of the drink container using the rear-facing camera. In response to the visual search module 500 providing the augmented reality experience associated with the drink container, the client device 102 automatically switches to the front-facing camera to augment an image of the user's face with the graphical elements representing the holiday. The user can select an option to capture an image or video of the user interacting with the graphical elements 934 presented in the user interface and share the image or video with one or more friends.

Figure 9D:
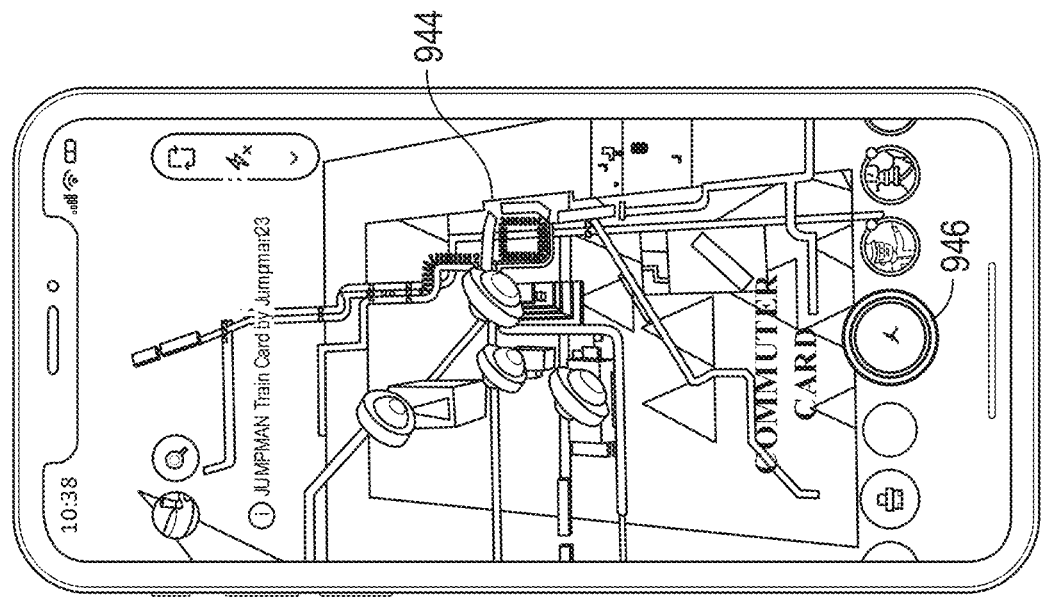
Figure 9D:
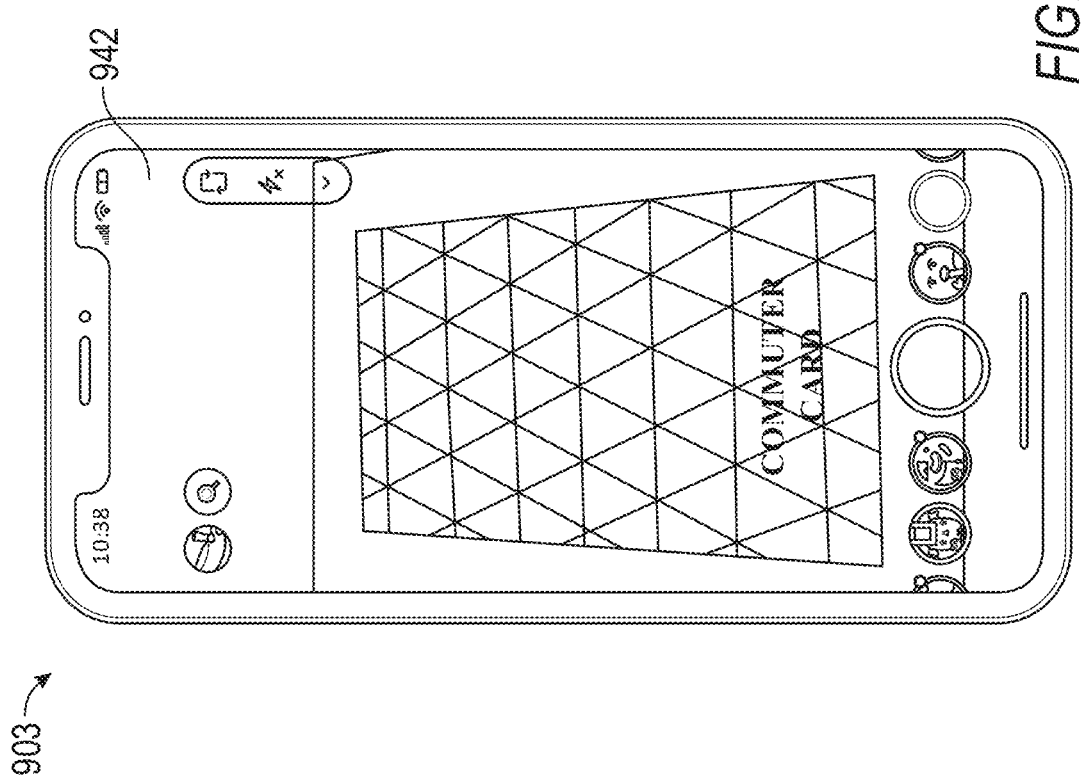

As another example, the one or more images captured by the client device 102 may include an object 942 (e.g., an image of a commuter card, such as a railway or airplane ticket) (FIG. 9D). The visual search module 500 extracts a plurality of features of the object 942 and searches a visual search database to identify one or more marker images. While the visual search module 500 performs the scan and extraction of the plurality of features, a progress indicator (such as the word "scanning" or a set of music icons) is displayed on the user interface of the client device 102.

In an embodiment, the visual search module 500 generates a TF-IDF vector based on visual words corresponding to the extracted features of the object 942 and compares the TF-IDF vector against TF-IDF vectors stored in the visual search database. The visual search module 500 ranks the identified matching images based on performing geometric verifications of the identified matching images. The visual search module 500 selects an augmented reality experience that is associated with a selected one of the identified matching images (e.g., the top ranked matching image). The visual search module 500 provides the augmented reality experience to the client device 102 or instructs the client device 102 to activate the particular augmented reality experience. As an example, as shown in FIG. 9D, the augmented reality experience includes the presentation of a user interface with a graphical elements 944 (e.g., a three-dimensional presentation of a commuter map, such as an interactive railway map) associated with the commuter card that is scanned as the object 942.

Specifically, in some embodiments, the visual search module 500 stores a plurality of different augmented reality experiences representing different commuter systems (public transit modes of transportation), such as different railway maps for different regions, different subway maps for different regions, different train maps for different regions, different bus maps for different regions. Each of the commuter based augmented reality experiences is associated with a respective marker image of a commuter card associated with the given region. For example, a first subway map that includes one or more graphical elements representing a first subway system is associated with a first marker image of a first subway card that can be used to access the first subway system in the first region. A second subway map that includes one or more graphical elements representing a second subway system is associated with a second marker image of a second subway card that can be used to access the second subway system in the second region. In response to the visual search module 500 matching the object 942 to the second marker image, the visual search module causes the client device 102 to activate the augmented reality experience in which the one or more graphical elements representing the second subway system is displayed. The one or more graphical elements may be displayed as an overlay on top of the image of the subway card captured as the object 942. The one or more graphical elements can be animated to represent a current location of a train (public transit vehicle).

The messaging application 104 presents a list of augmented reality experiences and visually identifies with an indicator 946 the augmented reality experience that has been automatically activated and selected based on a match detected by the visual search module 500. The user can interact with the graphical elements 944 displayed in the user interface. For example, the user can tap one of the graphical elements that are displayed and station information is presented that corresponds to the station represented by the tapped graphical element. In some embodiments, the client device 102 accesses a search history or conversation history of the user to predict or determine a destination for the user. Based on the determined destination, the client device 102 displays a visual indicator or visually distinguishes one of the graphical elements 944 that corresponds to a station associated with the determined destination. This alerts the user as to which station the user needs to reach to arrive at the destination. The client device 102 may determine a current location for the user and visually distinguish one of the graphical elements 944 that corresponds to a station associated with the current location. The graphical element corresponding to the current location may be displayed using different visual properties (e.g., with a different visual indicator or may be visually distinguished) from the station corresponding to the destination. For example, a green circle may be placed around the graphical element 944 corresponding to the station closest to the user's current location and a red circle may be placed around the graphical element 944 corresponding to the station closest to the destination.

Figure 9E:
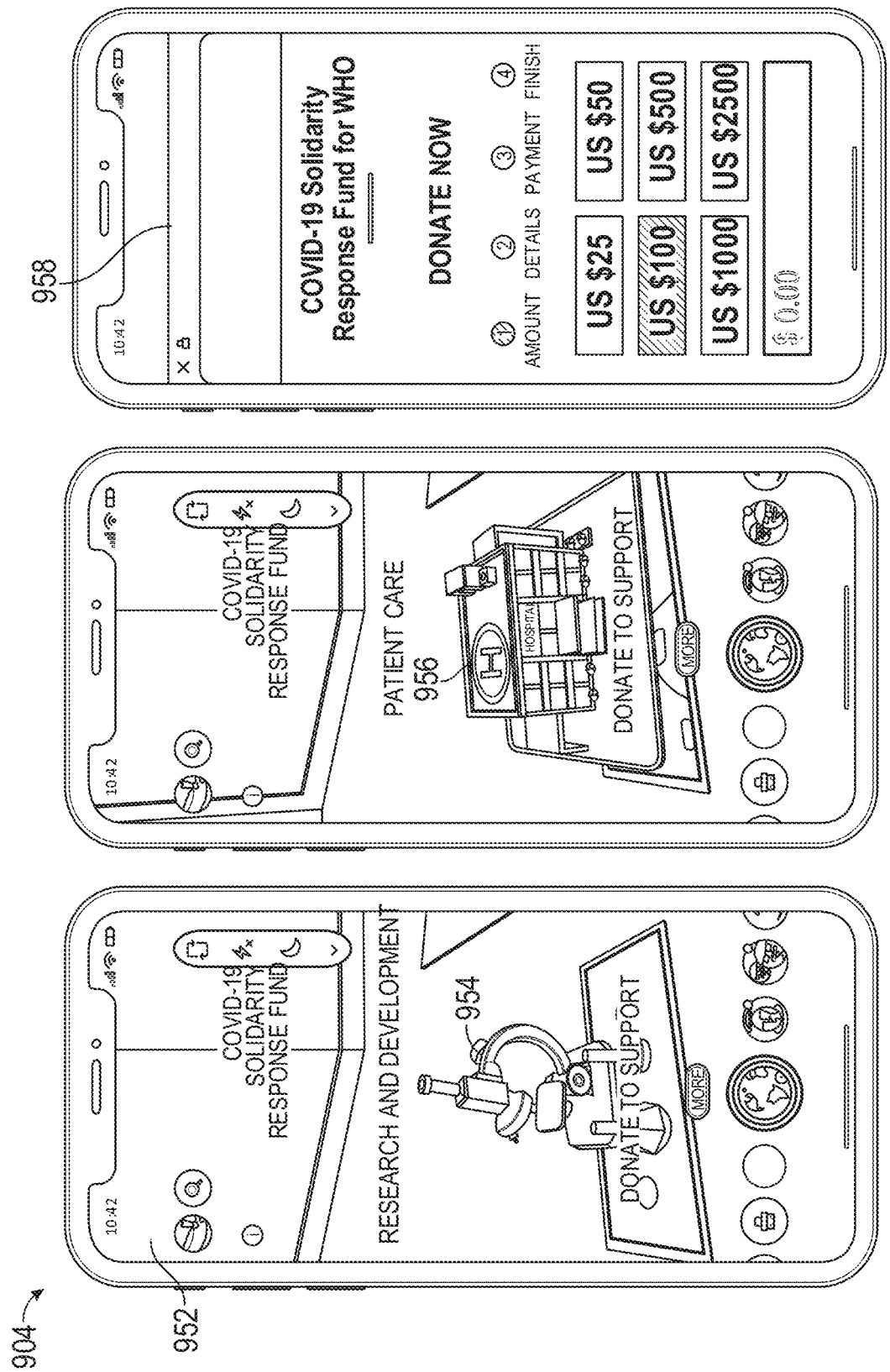

As another example, the one or more images captured by the client device 102 may include an object 952 (e.g., an image of a currency) (FIG. 9E). The visual search module 500 extracts a plurality of features of the object 952 and searches a visual search database to identify one or more marker images. While the visual search module 500 performs the scan and extraction of the plurality of features, a progress indicator (such as the word "scanning" or a set of music icons) is displayed on the user interface of the client device 102.

In an embodiment, the visual search module 500 generates a TF-IDF vector based on visual words corresponding to the extracted features of the object 952 and compares the TF-IDF vector against TF-IDF vectors stored in the visual search database. The visual search module 500 ranks the identified matching images based on performing geometric verifications of the identified matching images. The visual search module 500 selects an augmented reality experience that is associated with a selected one of the identified matching images (e.g., the top ranked matching image). The visual search module 500 provides the augmented reality experience to the client device 102 or instructs the client device 102 to activate the particular augmented reality experience. As an example, as shown in FIG. 9E, the augmented reality experience includes the presentation of a user interface with one or more graphical elements 954 (e.g., a three-dimensional presentation of a research and development icon, such as a microscope). The one or more graphical elements 954 may represent a charity that matches a profile of the user of the client device 102. As another example, as shown in FIG. 9E, the augmented reality experience includes the presentation of a user interface with another set of one or more graphical elements 956 (e.g., a three-dimensional presentation of a hospital).

In one embodiment, the graphical elements 954 may animate out of view after a specified period of time and the graphical elements 956 may be animated into view on top of the image of the currency. For example, the visual search module 500 may indicate the position within the screen of the currency that is depicted. The client device 102 may position the graphical elements 954 and 956 on top of the position of the currency.

Specifically, in some embodiments, the visual search module 500 stores a plurality of different augmented reality experiences representing different charities. Each of the charity based augmented reality experiences is associated with a respective marker image of a currency. For example, a first charity that includes one or more graphical elements representing the first charity is associated with a first marker image of a first currency (e.g., a type of currency, a value of the currency, or a region associated with the currency). A second charity that includes one or more graphical elements representing the second charity is associated with a second marker image of a second currency (e.g., a type of currency, a value of the currency, or a region associated with the currency). In response to the visual search module 500 matching the object 952 to the second marker image, the visual search module causes the client device 102 to activate the augmented reality experience in which the one or more graphical elements representing the second charity is displayed.

In some embodiments, the visual search module 500 stores a plurality of different augmented reality experiences representing different currencies (e.g., values or types of currency). Each of the charity based augmented reality experiences is associated with a respective marker image of a currency type or value. For example, a first charity includes a first set of graphical elements representing the first charity that is associated with a first marker image of a first currency. A second set of graphical elements representing the first charity is associated with a second marker image of a second currency. In response to the visual search module 500 matching the object 952 to the second marker image, the visual search module causes the client device 102 to activate the augmented reality experience in which the second set of graphical elements representing the first charity is displayed.

In some embodiments, a plurality of charities may be associated with a given marker image. The visual search module 500 ranks the plurality of charities associated with the given marker image based on profile information of the user of the client device 102. In this way, the top ranked charity that is of greatest interest to the user may be represented to the user by a respective augmented reality experience in the client device 102 in response to the user capturing an image of currency. The visual search module 500 may alternatively or additionally rank the plurality of charities associated with the given marker image based on friends of the user of the client device 102 on the messaging application 104. In this way, the top ranked charity that is of greatest interest to friends of the user may be represented to the user by a respective augmented reality experience in the client device 102 in response to the user capturing an image of currency. For example, if one of the user's friends previously donated money to the particular charity, that charity may be selected to be represented by the augmented reality experience on the client device 102.

The user can interact with the graphical elements 944 displayed in the user interface. For example, the user can tap one of the graphical elements that are displayed and a website 958 is accessed and is presented that corresponds to the charity represented by the tapped graphical element. The website 958 may allow the user to select between a plurality of options to donate money to the charity. In some implementations, the value of the currency depicted as the object 952 is determined by the visual search module 500. The visual search module 500 may instruct the client device 102 to automatically highlight or select an option to donate money to the charity based on the determined value of the currency. For example, if the user scans an image of a one hundred dollar bill, the website 958 may automatically highlight the option to donate one hundred dollars to the charity associated with the graphical elements 954. In response to the user completing a donation to the charity, the one or more graphical elements representing the charity may be animated or change to indicate that the user completed the donation to the charity.

Figure 10:
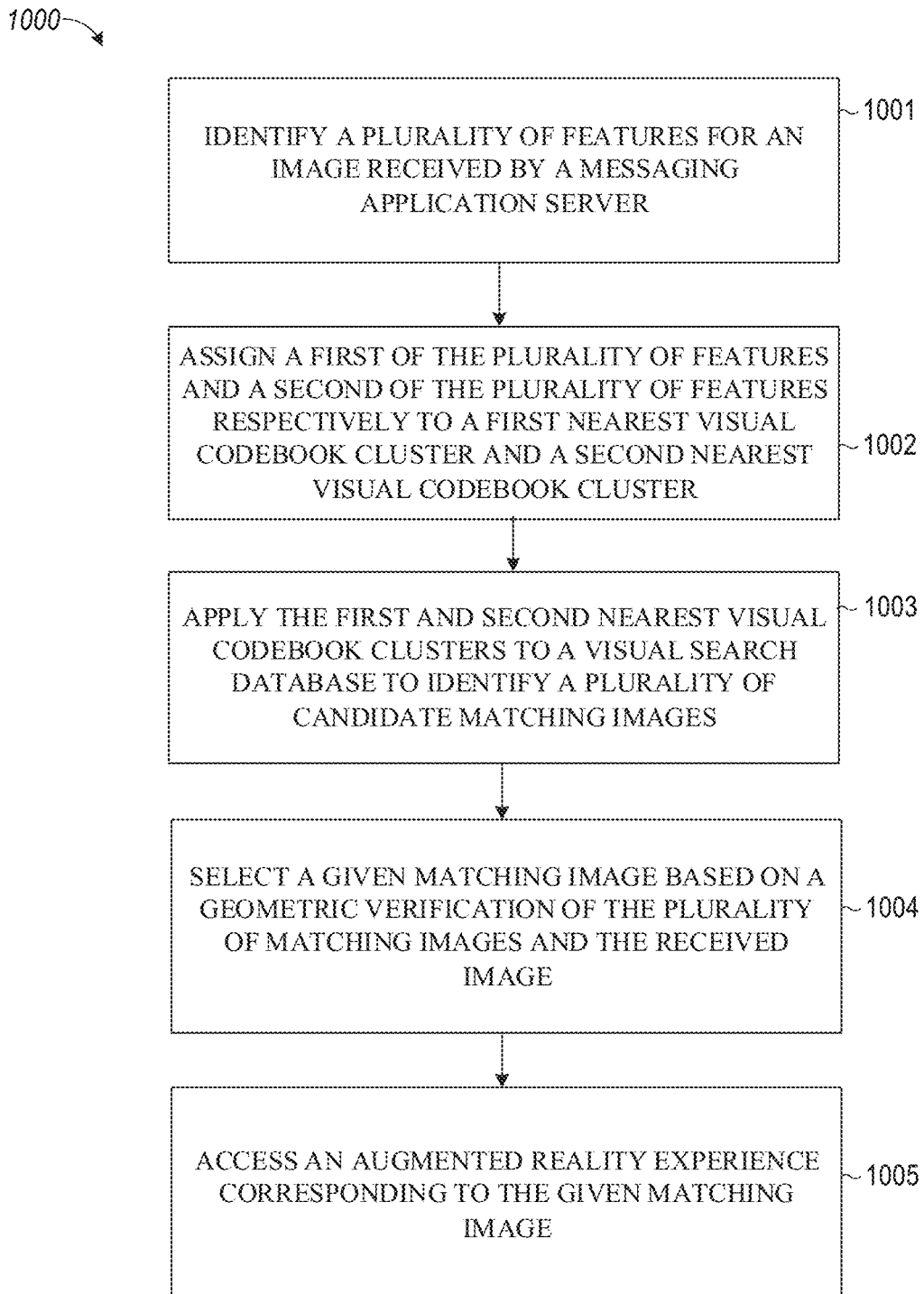
FIG. 10 is a flowchart illustrating example operations of the messaging application server, according to example embodiments.

FIG. 10 is a flowchart illustrating example operations of the messaging client 104 in performing process 1000, according to example embodiments. The process 1000 may be embodied in computer-readable instructions for execution by one or more processors such that the operations of the process 1000 may be performed in part or in whole by the functional components of the messaging server system 108; accordingly, the process 1000 is described below by way of example with reference thereto. However, in other embodiments at least some of the operations of the process 1000 may be deployed on various other hardware configurations. The operations in the process 1000 can be performed in any order, in parallel, or may be entirely skipped and omitted.

At operation 1001, the image processing server 122 identifies a plurality of features for an image received by a messaging application server. For example, the image processing server 122 receives a query image and identifies a set of features 610 and 612 of the query image (FIG. 6).

At operation 1002, the image processing server 122 assigns a first of the plurality of features and a second of the plurality of features respectively to a first nearest visual codebook cluster and a second nearest visual codebook cluster. For example, the image processing server 122 assigns the first set of features 610 to a first cluster of features 620 (a first nearest visual codebook cluster) and assigns the second set of features 612 to a second cluster of features 622 (a second nearest visual codebook cluster).

At operation 1003, the image processing server 122 applies the first and second nearest visual codebook clusters to a visual search database to identify a plurality of candidate matching images. For example, the image processing server 122 obtains the TF-IDF matrix from the module 526 and computes a cosine similarity between a TF-IDF value of the first and second nearest visual codebook clusters and the TF-IDF matrix obtained from the module 526. Specifically, the image processing server 122 computes a TF-IDF value for each visual word that is present or identified in the query image and compares that TF-IDF value with the TF-IDF values obtained from the module 526. The top matching TF-IDF values are used to identify the matching marker images as the candidate matching images.

At operation 1004, the image processing server 122 selects a given matching image based on a geometric verification of the plurality of matching images and the received image. For example, the image processing server 122 first performs a Lowe's ratio test to compare a ratio of principal curves of the plurality of matching images and the received image to a threshold. Then, the image processing server 122 performs a random sample consensus (RANSAC) operation to verify the key points and then uses the number of inliers as the matching candidate score to re-rank the candidate marker images.

At operation 1005, the image processing server 122 access an augmented reality experience corresponding to the given matching image. For example, the image processing server 122 retrieves the augmented reality experience associated with a top ranked marker image, such as one or more of the augmented reality experiences discussed in connection with FIGS. 9A-E.

Machine Architecture

Figure 11:
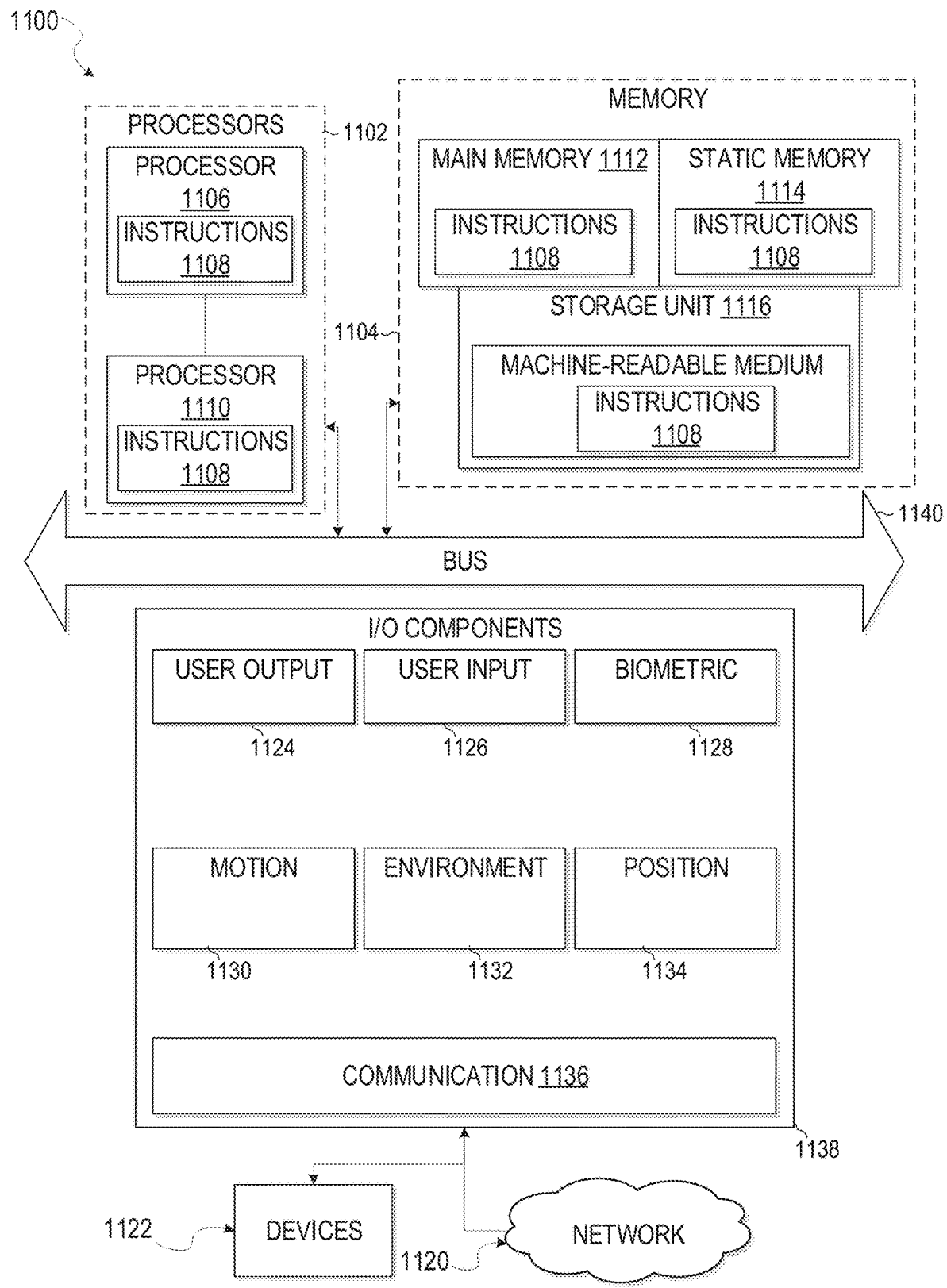
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described.

The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
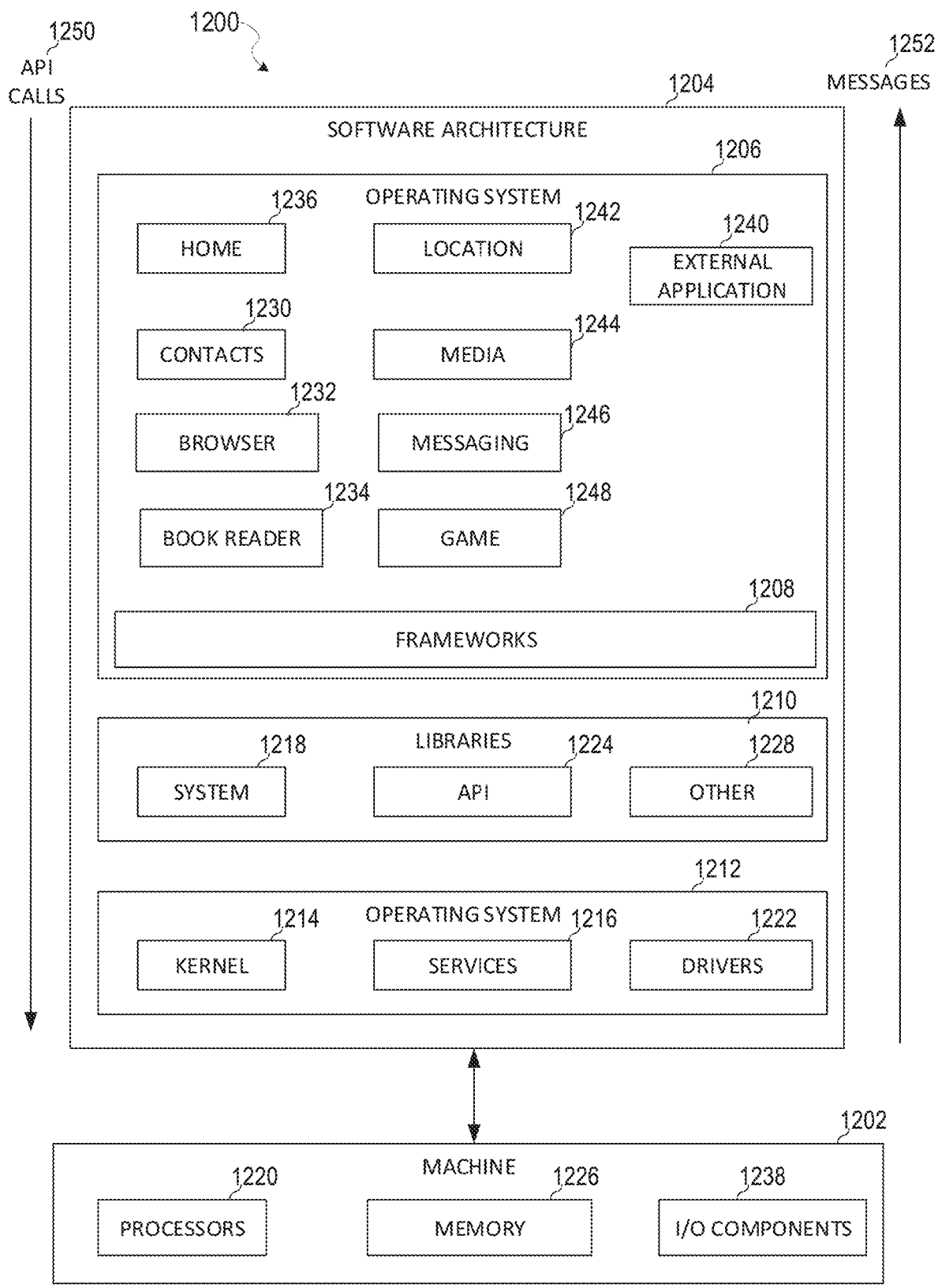
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed embodiments without departing from the scope of the present disclosure. These and other changes or modifications are intended to be included within the scope of the present disclosure, as expressed in the following claims.

What is claimed is:

1. A method comprising:
   capturing, by a client device implementing a messaging application, an image that depicts currency;
   receiving, from a server, an identification of an augmented reality experience associated with the image, the server identifying the augmented reality experience by assigning visual words to features of the image and searching a visual search database to identify a plurality of marker images associated with one or more charities, the server selecting a given one of the plurality of marker images by performing a plurality of geometric computations between the image that depicts the currency and each of the plurality of marker images and ranking the plurality of marker images, and the server retrieving the augmented reality experience associated with the given one of the plurality of marker images;
   automatically, in response to capturing the image that depicts currency, displaying one or more graphical elements of the identified augmented reality experience that represent a charity of the one or more charities; and receiving a donation to the charity from a user of the client device in response to an interaction with the one or more graphical elements that represent the charity.

2. The method of claim 1, wherein the server computes a root scale-invariant feature transform (SIFT) based on the features of the image.

3. The method of claim 1, wherein the server performs operations comprising:

identifying, based on the features, a plurality of descriptors and corresponding key points for the image; and applying the plurality of descriptors and the corresponding key points to a visual word codebook and document frequency index, generated based on training images, to compute a visual word histogram and a term frequency-inverse document frequency (TF-IDF) vector for the image.

4. The method of claim 3, wherein the visual search database represents a TF-IDF vector of visual words for the plurality of marker images, and wherein the server computes cosine similarity between the TF-IDF vector of the image and the TF-IDF vectors of the plurality of marker images.

5. The method of claim 1, wherein the server ranks the plurality of marker images to select the given one of the marker images by:

performing a first of the plurality of geometric computations comprising a Lowe's ratio test to compare, to a threshold, a ratio of principal curves of the plurality of marker images and the image that depicts the currency; and after performing the first of the plurality of geometric computations, performing a second of the plurality of geometric computations comprising a random sample consensus operation to verify key points of the plurality of marker images and the image that depicts the currency and using a number of inliers as a matching candidate score.

6. The method of claim 1, further comprising:

displaying a first set of graphical elements associated with the charity for a threshold period of time; and automatically after the threshold period of time, animating the first set of graphical elements out of view and animating a second set of graphical elements associated with the charity into view on top of a position of the currency depicted in the image.

7. The method of claim 1, further comprising:

selecting a graphical element from the one or more graphical elements to display based on a user profile; and displaying the selected graphical element on top of the currency depicted in the image.

8. The method of claim 1, further comprising:

determining that the user has previously made a donation to the charity;

selecting a graphical element from the one or more graphical elements to display based on determining that the user has previously made the donation to the charity; and displaying the selected graphical element on top of the currency depicted in the image.

9. The method of claim 1, further comprising:

determining that a friend of the user has previously made a donation to the charity.

10. The method of claim 9, wherein the server ranks the identified plurality of marker images based on a determination that the friend of the user has previously made the donation to the charity.

11. The method of claim 1, further comprising:

receiving a user input that taps on the one or more graphical elements; and in response to receiving the input, navigating the user to a website associated with the charity.

12. The method of claim 11, wherein the website displays a plurality of options to donate to the charity.

13. The method of claim 12, further comprising visually indicating a given one of the options based on a value of the currency depicted in the image.

14. The method of claim 13, wherein the server provides an identification to the client device of the value of the currency depicted in the image.

15. The method of claim 1, wherein the server stores a plurality of different augmented reality experiences representing different charities, each of the augmented reality experiences is associated with a respective marker image of a currency.

16. The method of claim 1, wherein a first charity that includes one or more graphical elements representing the first charity is associated with a first marker image of a first a type of currency, a first a value of the currency, or a first region associated with the currency.

17. The method of claim 1, wherein the one or more graphical elements depict currency graphical elements associated with the currency depicted in the image.

18. A system comprising:

a processor configured to perform operations comprising:

capturing, by a client device implementing a messaging application, an image that depicts currency;

receiving, from a server, an identification of an augmented reality experience associated with the image, the server identifying the augmented reality experience by assigning visual words to features of the image and searching a visual search database to identify a plurality of marker images associated with one or more charities, the server selecting a given one of the plurality of marker images by performing a plurality of geometric computations between the image that depicts the currency and each of the plurality of marker images and ranking the plurality of marker images, and the server retrieving the augmented reality experience associated with the given one of the plurality of marker images;

automatically, in response to capturing the image that depicts currency, displaying one or more graphical elements of the identified augmented reality experience that represent a charity of the one or more charities; and receiving a donation to the charity from a user of the client device in response to an interaction with the one or more graphical elements that represent the charity.

19. The system of claim 18, wherein the plurality of geometric computations comprise a Lowe's ratio test and a random sample consensus operation.

20. A non-transitory machine-readable storage medium that includes instructions that, when executed by one or more processors of a machine, cause the machine to perform operations comprising:

capturing, by a client device implementing a messaging application, an image that depicts currency;

receiving, from a server, an identification of an augmented reality experience associated with the image, the server identifying the augmented reality experience by assigning visual words to features of the image and searching a visual search database to identify a plurality of marker images associated with one or more charities, the server selecting a given one of the plurality of marker images by performing a plurality of geometric computations between the image that depicts the currency and each of the plurality of marker images and ranking the plurality of marker images, and the server retrieving the augmented reality experience associated with the given one of the plurality of marker images;

automatically, in response to capturing the image that depicts currency, displaying one or more graphical elements of the identified augmented reality experience that represent a charity of the one or more charities; and receiving a donation to the charity from a user of the client device in response to an interaction with the one or more graphical elements that represent the charity.

* * * * *